(12) United States Patent
Eaton et al.

(10) Patent No.: US 11,105,449 B1
(45) Date of Patent: Aug. 31, 2021

(54) CONDUIT FITTING DEVICE WITH INTERNAL GROUND

(71) Applicant: Richard A. Eaton, Sedalia, CO (US)

(72) Inventors: Richard A. Eaton, Sedalia, CO (US); Don Gilbreath, Castle Rock, CO (US)

(73) Assignee: Richard A. Eaton, Sedalia, CO (US)

( * ) Notice: Subject to any disclaimer, the term of this patent is extended or adjusted under 35 U.S.C. 154(b) by 888 days.

(21) Appl. No.: 15/428,337

(22) Filed: Feb. 9, 2017

(51) Int. Cl.
*F16L 25/01* (2006.01)
*F16L 15/00* (2006.01)
*F16L 27/107* (2006.01)
*F16L 51/00* (2006.01)

(52) U.S. Cl.
CPC .............. *F16L 25/01* (2013.01); *F16L 15/006* (2013.01); *F16L 27/107* (2013.01); *F16L 51/00* (2013.01)

(58) Field of Classification Search
CPC ......... F16L 25/01; F16L 27/107; F16L 51/00; F16L 15/006; F16L 27/127; F16L 27/1274; F16L 27/125; F16L 27/12; H01R 9/05; H02G 15/013; H02G 15/04
See application file for complete search history.

(56) References Cited

U.S. PATENT DOCUMENTS

| | | | |
|---|---|---|---|
| 3,154,632 A * | 10/1964 | Browne | F16L 27/1274 174/86 |
| 3,240,868 A | 3/1966 | Ets-Hokin et al. | |
| 3,416,819 A | 12/1968 | Day | |
| RE27,224 E * | 11/1971 | Parrett | F16L 27/1274 91/52 |
| 3,783,178 A | 1/1974 | Parkins et al. | |
| 4,487,462 A * | 12/1984 | Gale | H01R 4/646 439/92 |
| 4,558,173 A | 12/1985 | Gajajiva et al. | |
| RE33,611 E * | 6/1991 | Michaels | H01R 9/0527 439/462 |
| 5,466,890 A | 11/1995 | Stagnitti | |
| 2003/0029625 A1 | 2/2003 | Magno | |

OTHER PUBLICATIONS

PCT App. No. PCT/US2018/017637, International Search Report and Written Opinion, dated Jun. 25, 2018, 12 pages.

(Continued)

*Primary Examiner* — Matthew Troutman
*Assistant Examiner* — James A Linford
(74) *Attorney, Agent, or Firm* — Avant Law Group, LLC

(57) ABSTRACT

Embodiments of the present invention are directed to conduit fittings with internal grounding capability. One expansion fitting allows for lengthwise expansion of an inner conduit utilizing an interior cylinder. The interior cylinder has a grounding portion that is conductive, and the grounding portion is electrically connected with a ground screw, Earth ground, or neutral ground. Another deflection fitting allows for angular deflection of connected conduits. The angular deflection fitting has an outer sleeve that is folded over an inner tube, and the outer sleeve is electrically connected with a ground screw, Earth ground, or neutral ground. Another expansion-deflection fitting shares the properties of the expansion fitting and the deflection fitting.

13 Claims, 11 Drawing Sheets

(56) References Cited

OTHER PUBLICATIONS

OZ/Gedney DX-100 OZ-G 1IN Expansion Joint—Crescent Electric Supply Company, http:www.cesco.com/b2c/product/OZ-Gedney-DX-100-OZ-G-1IN-EXPANSION-JOINT/.

AXB Expansion Fittings, EGS Electrical Group, Emerson Industrial Automation, www.o-zgedney.com.

http://online.flipbuilder.com/sfunkhouser/yymv/, GAFCO Industries, Expansion Deflection Fittings, 2016, vol. 103, 11 pages.

http://www.cooperindustries.com/content/dam/public/crousehinds/resources/pdfs/literature/conduit-expansion-deflection-couplings.pdf, Conduit Expansion/Deflection Couplings, Crouse-Hinds by Eaton, pp. 1-8.

http://www.cooperindustries.com/content/dam/public/crousehinds/commercial-products/catalog-pdfs/xjg.pdf, Crouse-Hinds by Eaton,, 2015 Commerical Products Catalog, XJR Rigid/IMC Expansion Couplings, p. 68.

http://www.cooperindustries.com/content/public/en/crouse-hinds/commercial_products/products/commercial_enclosures/conduit_expansionjoints/xjg_series_conduitexpansionjointsforrigidimc.html.

www.crouse-hinds.com, XJR Conduit Expansion Joints With Internal Grounding for Rigid Metal Conduit and IMC, 2013, p. 221.

\* cited by examiner

CONDUIT FITTING DEVICE WITH INTERNAL GROUND

FIELD

Embodiments of this application relate to conduit fittings, namely, expansion fittings and deflection fittings for use with electrical conduits.

BACKGROUND

Electrical conduits may be used for routing electrical wires in commercial and residential installations. Electrical conduit and fittings provide protection for enclosed conductors from environmental hazards, such as impact, moisture, electromagnetic interference, or chemical vapors. Fittings, including intermediate conduit and electrical conduits, may be made of metal, such as conductive materials like galvanized steel tubing, or non-conductive materials, such as plastic, fiber, or clay.

Electrical conduits may need to move relative to one another. Both expansion fittings and deflection fittings allow electrical conduits to move relative to one another, as well as provide flexibility to accommodate movement. Conventional expansion fittings accommodate longitudinal movement due to expansion and contraction of an electrical conduit—for example, due to fluctuations in temperature. Deflection fittings are flexible fittings that allow one or more conduits to move laterally relative to one another, and allow the fitting to absorb some vibrations.

Metallic conduits and fittings are often galvanized or electro-galvanized to protect the metal and aid in preventing rusting or other corrosion. Metallic conduits may be galvanized using the hot-dip method or thermal diffusion galvanization. Metallic conduits may be electro-galvanized through electroplating using alkaline or acidic electrolytes.

In many of these applications, it is necessary to establish an electrical ground connection. Metallic conduits are grounded due to the need to ground all metallic parts of the electrical system or appliance where applicable. This is so that a hot wire contacting the metal conduit by accident will trigger protective devices to trip and cut-off the electrical supply to that circuit. The ground is typically run externally, by means of jumping or bonding from a grounding screw. The external ground is left open to the environment and therefore subject to damage due to environmental hazards.

In other instances, the ground can be run internally using ground wires, or steel conduit can act as an equipment grounding conductor. When metallic conduits are used as equipment grounding conductors, they must have the required conductivity and continuity to pass current to the ground. Equipment grounding conductors bond non-current carrying parts of an electrical system and provide a low impedance path for ground fault current.

SUMMARY

In one embodiment, an expansion fitting device comprises a longitudinal tubular body having a central bore defining an internal surface. The tubular body has first and second ends, the first end is mateable with a first electrical conduit, and the second end has a threaded portion. The expansion fitting device also has a ring shaped cap that is threaded on a first end. The threaded first end is sized and shaped to mate with the threaded portion at the second end of the tubular body. The expansion fitting device also has an internal cylinder that is slideable and positioned within the central bore of the tubular body. The internal cylinder has a central bore that defines an internal surface and a ring shaped bushing coupled to a ground transfer portion on a first end of the bushing. The ground transfer portion is in contact with the internal surface of the tubular body. The internal cylinder is configured to be coupled to a second electrical conduit on a second end of the bushing.

In another embodiment, a deflection fitting comprises a first conduit connector and a conductive sleeve. The first conduit connector has an outer surface and a central bore defining an inner surface. The central bore passes through the first and second ends of the conduit connector. The conductive sleeve has a central bore, and the first conduit connector is situated within the central bore such that a portion of the sleeve folds inwardly and is in contact with the outer surface of the first conduit connector. The sleeve is further coupled to the first conduit connector at the second end of the first conduit connector.

In yet another embodiment, an expansion-deflection conduit fitting comprises a longitudinal tubular body, a cap, an internal cylinder, a first conduit connector, and a conductive sleeve. The tubular body has a central bore defining an internal surface. The tubular body has first and second ends, and the second end has a threaded portion. The cap is ring shaped and threaded on a first end. The threaded first end is sized and shaped to mate with the threaded portion at the second end of the longitudinal tubular body. The internal cylinder is slideable and positioned the central bore of the tubular body, and has a central bore defining an internal surface of the internal cylinder. The internal cylinder has a ring shaped bushing coupled to a ground transfer portion on a first end of the bushing, and is configured to be coupled to a second electrical conduit on a second end of the bushing. The ground transfer portion is connected to a ground circuit. The first conduit connector has an outer surface and a central bore defining an inner surface. The central bore passes through first and second ends of the conduit connector. The conductive sleeve has a central bore. The first conduit connector is situated within the central bore of the conductive sleeve such that a portion of the sleeve folds inwardly and is in contact with the outer surface of the first conduit connector. The sleeve is coupled to the first conduit connector at the second end of the first conduit connector. A portion of the sleeve folded inwardly is connected to a ground circuit.

Many different arrangements are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the invention. The description should not be restricted to the specific described embodiments.

These and other features and advantages will be apparent to those skilled in the art upon viewing the drawings that are described in brief below and reading the detailed description of the invention that follows.

DETAILED DESCRIPTION

Figure 1:
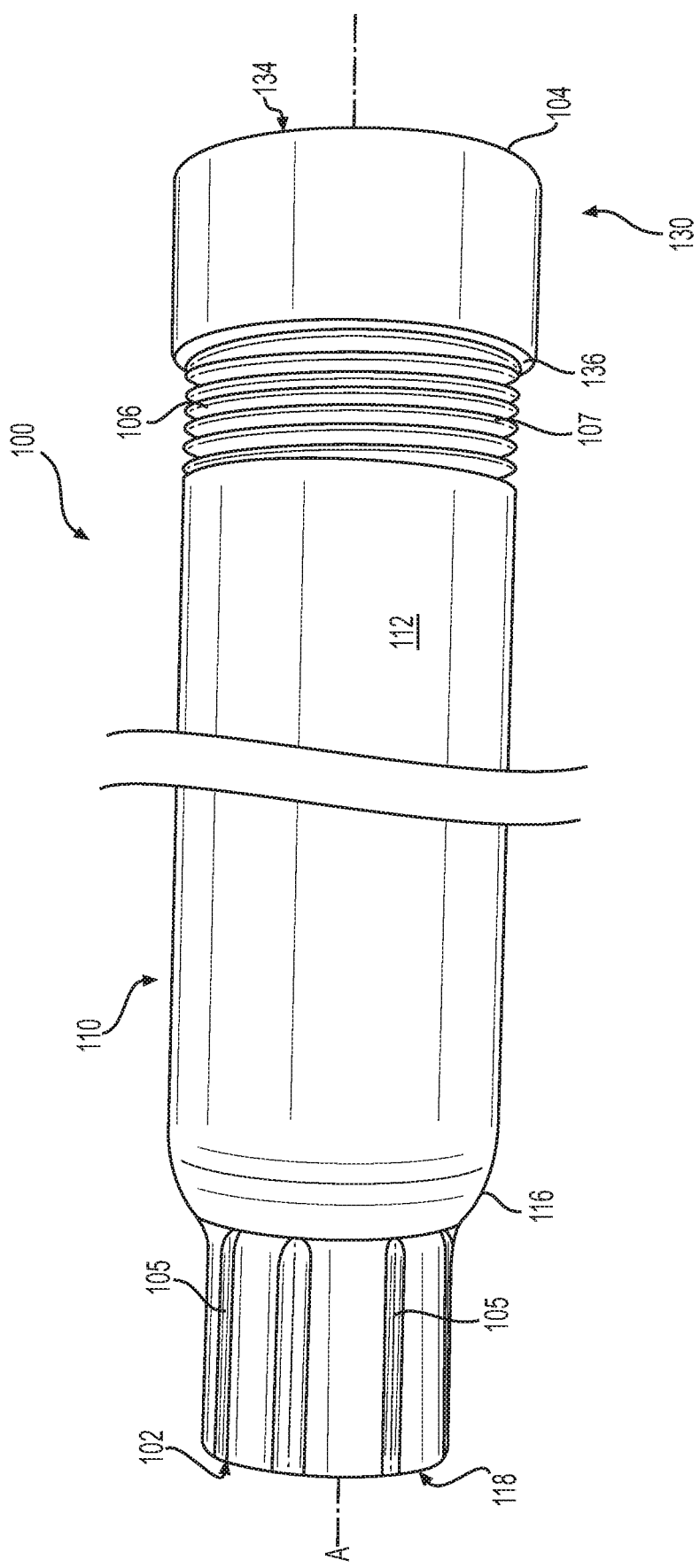
FIG. 1 is a side view of an assembled expansion fitting.
Figure 2:
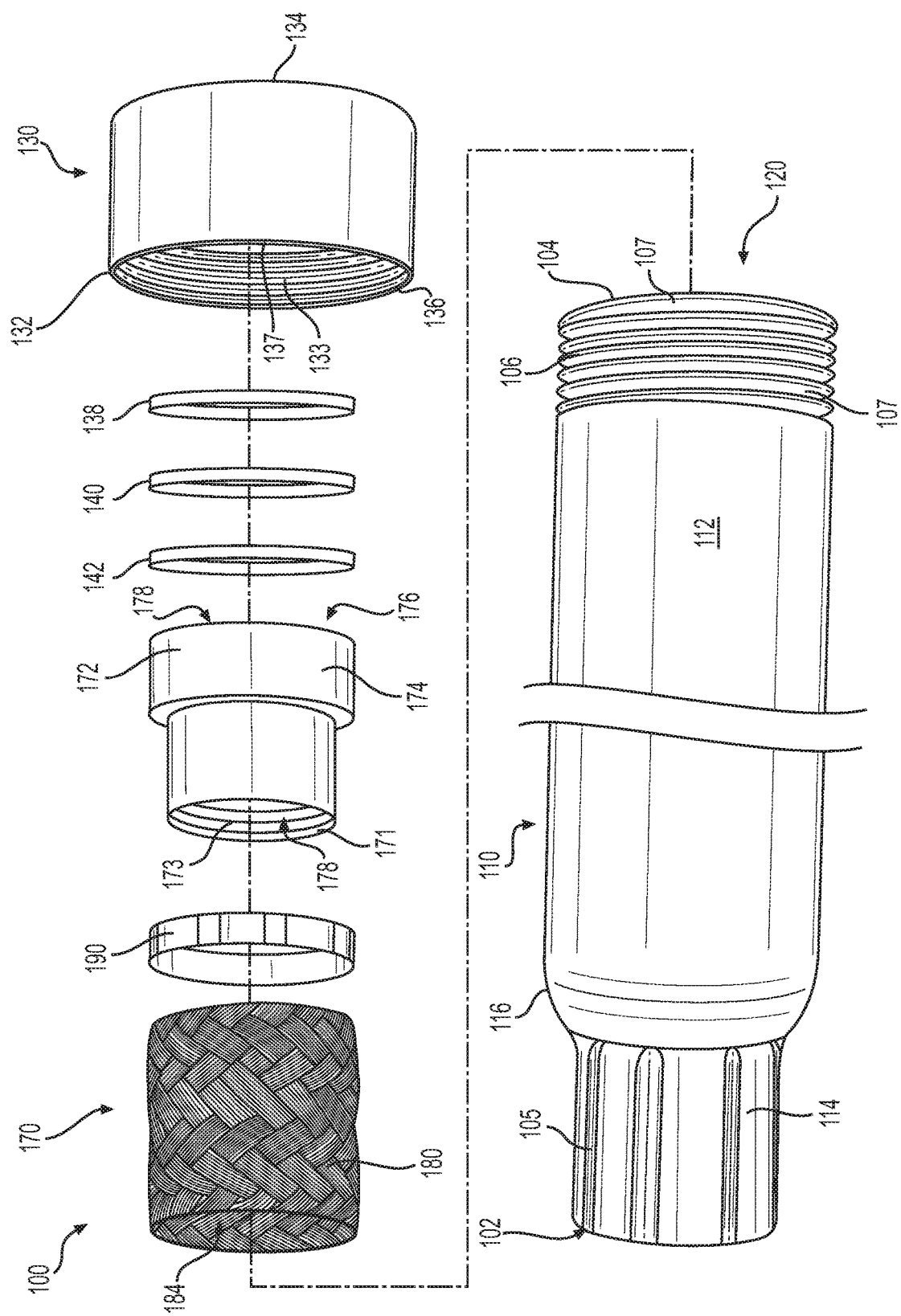
FIG. 2 is an exploded view of the expansion fitting.

Those skilled in the art will recognize that the embodiments described herein are subject to modification and alteration without departing from the teaching herein. Therefore, the present discussion should not be considered limiting but an exemplification of the features of the invention.

In the illustrated embodiment in FIGS. 1-4, an electrical expansion fitting 100 is shown. The electrical expansion fitting 100 has a cylindrical body 110, a cap 130, and an internal cylinder 170. The cylindrical body 110 is hollow with a central bore 120 along a longitudinal axis A with an inner surface 108, and the internal cylinder 170 fits inside the inner surface 108 of the cylindrical body 110. The expansion fitting 100 may be made from metals such as stainless steel, galvanized steel, electro-galvanized steel, aluminum, or any appropriate materials known in the art, whether now known or later developed. It may also be thin walled, thick walled, flexible, or rigid.

The cylindrical body 110 has an outer surface 112 with a first end 102 and a second end 104. The cylindrical body 110 may have a threaded area 106 on the outer surface 112 of the cylindrical body 110 at the second end 104. The threaded area 106 has threads 107, which are sized and shaped to interact with threads 131 on the interior 132 of the cap 130. The inner surface 108 of the cylindrical body 110 has a cylindrical portion 122, the cylindrical portion 122 maintains a relatively uniform diameter d1 from the second end 104 towards a neck 116. The neck 116 extends and tapers from the cylindrical portion 122 to a conduit connector portion 114 of the cylindrical body 110. The conduit connector portion 114 is a hollow, cylindrical tube having an inner surface 118 and an outer surface 119. The conduit connector portion 114 has a diameter d2 that is less than the diameter d1 of the cylindrical portion 122 of the cylindrical body 110.

The conduit connector portion 114 may be adapted to be coupled to another fitting, electrical pipe, or conduit, and it is foreseen that a portion of the conduit connector portion 114 may be threaded. Alternatively, the conduit connector portion 114 may have small grooves 105 extending along the longitudinal axis A at least partially around the circumference so that an electrical pipe or conduit can be secured. It is foreseen that the grooves 105 may be angled. The conduit connector portion 114 may be adapted to be coupled to a pipe (e.g., schedule 40).

Figure 4:
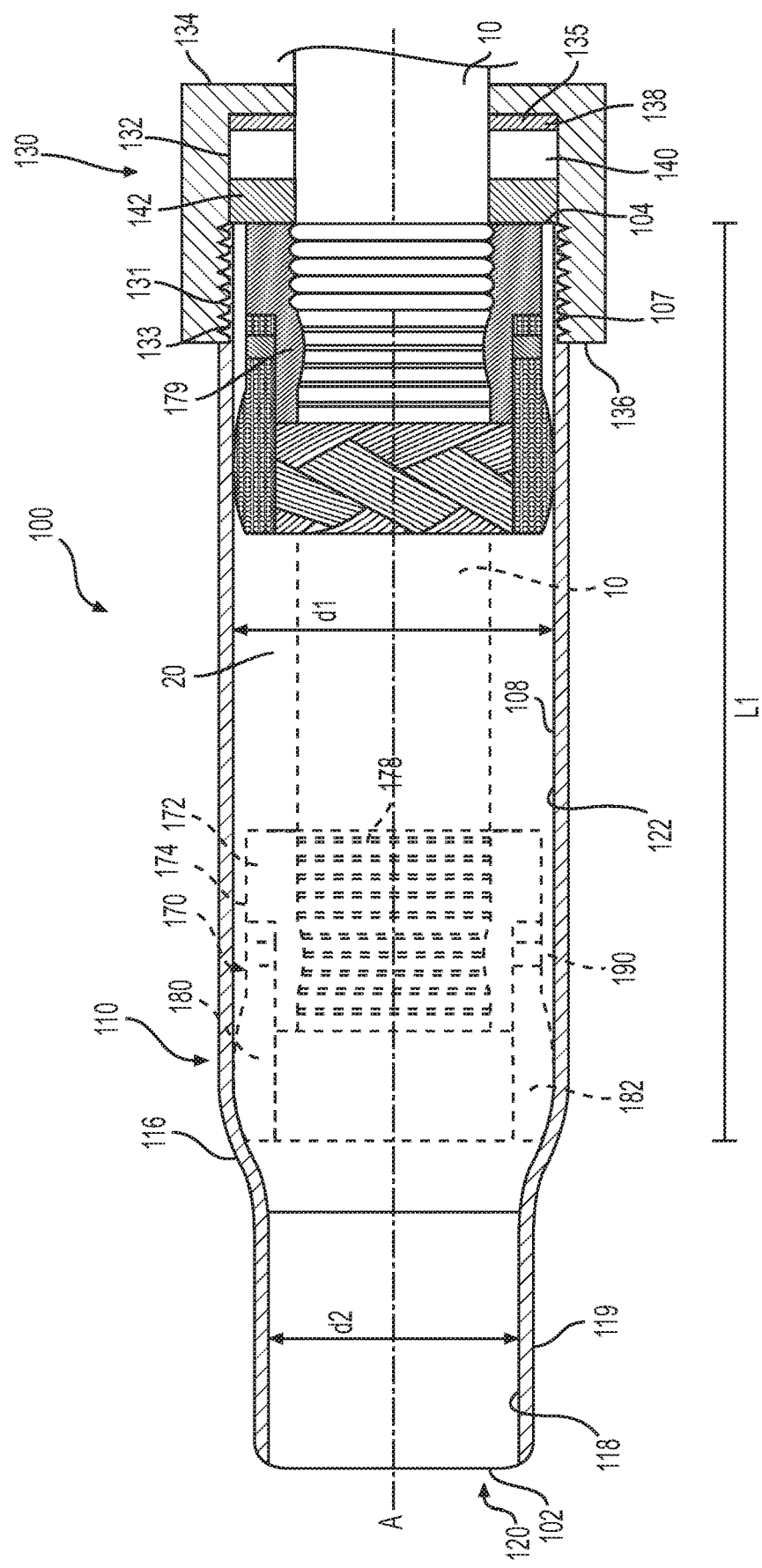
FIG. 4 is a cross sectional view of the expansion fitting and electrical conductor and electrical conduit with portions cut away and with portions shown in phantom.

The cap 130 may be substantially cylindrically ring-shaped and may be removably coupled to the second end 104 of the cylindrical body 110. The interior surface 132 of the cap 130 has a portion 133 that is at least partially threaded. The cap 130 has a head end 134 and a bottom end 136, with a stop surface 135 at the head end 134. The head end 134 has an internal diameter d11 defined by a central bore 137 so that electrical pipe or conduit 10 may pass through (FIG. 4). The cap 130 may have a ring shaped copper braid 138 situated along the interior 132 proximate the stop surface 135 at the head end 134. The ring-shaped copper braid 138 has an internal diameter d10 that is substantially similar to the internal diameter d11 of the head end 134. The internal diameter d10 may be sized to allow electrical pipe or conduit to pass through. The cap 130 may further include a ring shaped pliable washer 140 situated proximate the copper braid 138 along the interior 132. The pliable washer 140 may be made of polytetrafluoroethylene, or other substance that is moisture resistant and has a low friction coefficient. The pliable washer 140 has an internal diameter d9 that is substantially similar to the internal diameter d11 of the head end 134. The internal diameter d9 may be sized to allow electrical pipe or conduit to pass through. The cap 130 may further include a ring shaped rigid washer 142 situated proximate the pliable washer 140. The rigid washer 142 has an internal diameter d8 that is substantially similar to the internal diameter d11 of the stop surface 135. The internal diameter d8 may be sized to allow electrical pipe or conduit to pass through. The washer 142 may act as a stop for the internal cylinder 170.

The internal cylinder 170 comprises a bushing section 172 and a ground transfer portion 180. The internal cylinder 170 may be configured to fit snugly in the central bore 120 of the cylindrical body 110. The bushing section 172 has an outer surface 174 and a central bore 178 with an inner surface 176. The bushing 172 may have a threaded portion 171 with threads 173 that is adapted to be removably coupled to an electrical pipe or conduit (FIG. 4). The bushing 172 may be made from metals such as stainless steel, galvanized steel, electro-galvanized steel, aluminum, or any appropriate materials known in the art, whether now known or later developed.

Figure 3:
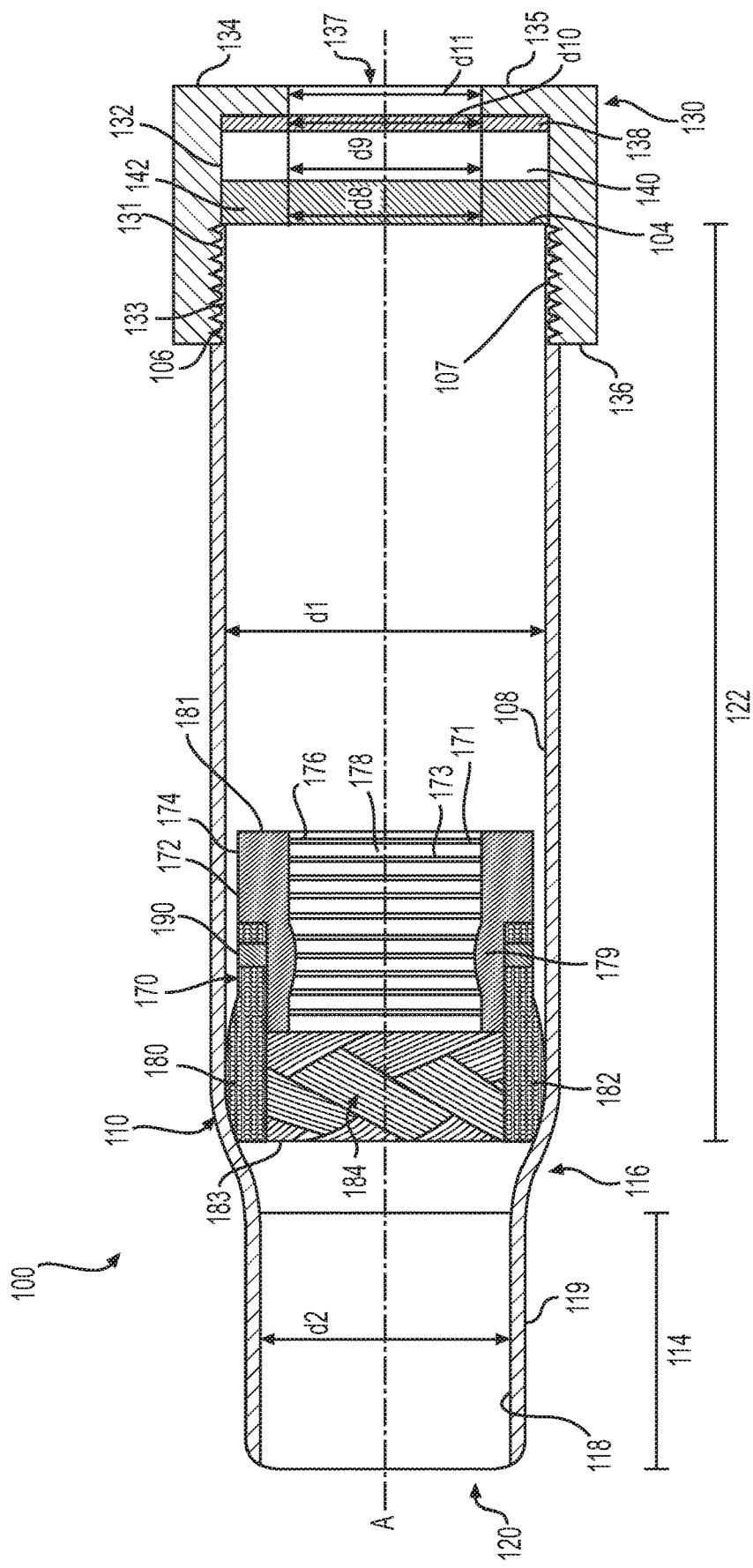
FIG. 3 is a cross sectional view of the expansion fitting with an electrical conductor.

The ground transfer portion 180 may be used to internally ground an electrical circuit by creating a pathway to Earth ground for ground loops or other unwanted voltages. The ground transfer portion 180 may be coupled to the bushing section 172 by means of a clamp or crimp ring 190. After the crimp ring 190 is fastened to the ground transfer portion 180 and the bushing section 172, the bushing section 172 may be warped, buckle inwards, or otherwise become deformed from a pressure applied while fastening the crimp ring 190 (see FIGS. 3 and 4). The deformed area of the bushing may act as a thread stop 179 for conduit or electrical pipe that may be removably coupled to the bushing 172 (FIG. 3). The bushing 172, the crimp ring 190, or both may be in contact with the inner surface 108 of the cylindrical body 110. In one embodiment, the ground transfer portion 180 is flexible. In another embodiment, the bushing 172 is at a first end 181 of the internal cylinder 170, and the ground transfer portion 180 is at a second end of 183 of the internal cylinder 170.

The ground transfer portion 180 may be composed of a highly conductive material that may be used to internally ground an electrical circuit, such as copper branded wire or any appropriate materials known in the art, whether now known or later developed. The braided copper wire may be multilayer with little or no distance between the braids. In one embodiment, the copper wire is 0.020 mm thick. Tightly compact braids may prevent arcing or excessive damaging arcing. Unintended arcing can have detrimental effects on electrical equipment, and can cause a short circuit. Having a multilayer, tightly compact braid is an advantage because it may aid in preventing foreign objects, dust, or moisture from interfering with the electrical circuit. Further, maintaining the copper braid in a tightly compact formation prevents individual copper wires that make up the braid from unraveling or separating.

The ground transfer portion 180 may be ring shaped with a central bore 184 and is smaller in length than the cylindrical body 110 to allow for lengthwise movement along axis A (FIG. 4). The ground transfer portion 180 may increase slightly in diameter as it extends to a contact area 182. The contact area 182 may be in contact with the inner surface 108 of the cylindrical body 110 when the internal cylinder 170 is inserted into the cylindrical member 110. In one embodiment, the contact area 182 is in continuous, 360 degree contact with the inner surface 108 of the cylindrical body 110. In another embodiment, the contact area 182 has at least a single contact point with the inner surface 108 sufficient to create a pathway to Earth ground.

Referring now to FIGS. 3-4, when in use, a first electrical conduit 10 is coupled to the bushing section 172 of the internal cylinder 170 by the threads 173 (FIG. 3). The internal cylinder 170 fits snugly inside the cylindrical body 110, and the contact area 182 of the ground transfer portion 180 is in contact with the inner surface 108 of the cylindrical body 110 to create a transfer of unwanted voltages to the outer surface 112 and then to Earth ground. The cap 130 is secured to the second end 104 of the cylindrical body 110, and the first electrical conduit 10 passes through the bore 137 of the cap 130. The contact section 182 electrically connects the conduit to the inner surface 108 of the cylindrical body 110, thereby internally grounding the circuit. The cylindrical body 110 may act as an equipment grounding conductor.

In one embodiment, an electrical ground conduit or wire may be secured to the ground transfer portion 180 of the internal cylinder 170. It is foreseen that a third wire may also be connected to the ground transfer portion 180 running through the first electrical conduit 10. In another embodiment, a bonding jumper or grounding strap may be used to ground the circuit. In yet another embodiment, an optional bonding jumper or grounding strap may be used to provide a visual indication that the circuit is properly grounded.

Electrical conduit 10 may expand and contract due to changes in temperature. The expansion fitting 100 allows for longitudinal movement of the conduit 10. It is foreseen that this may be between 4 to 8 inches, dependent upon a length L1 of the cylindrical body 110. The bushing section 172 is set at an appropriate place in the length L1 of the cylindrical body 110 to allow movement of the internal cylinder 170 along the length L1 of the cylindrical body 110 as the electrical conduit 10 expands and/or contracts. When the electrical conduit 10 contracts, the internal cylinder 170 is pushed towards the neck 116 of the cylindrical body 110 (shown in phantom in FIG. 4). When the electrical conduit 10 expands, the internal cylinder 170 is pulled towards the second end 104 of the cylindrical body 110 (shown solid in FIG. 4). The contact section 182 may be in continuous contact with the inner surface 108 of the cylindrical body 110 as it moves along the length L1 of the cylindrical body 110 due to expansion and contraction of the conduit 10.

The ground transfer portion 180 of the internal cylinder 170 may be in contact with the inner surface 108 of the cylindrical body 110, providing internal grounding continuity from the electrical conduit 10 to the outer surface 112 of the cylindrical body 110. In another embodiment, the ground transfer portion 182 may provide internal grounding continuity from the first electrical conduit to a ground screw, earth ground, or neutral ground. The contact between the ground transfer portion 180 and the inner surface 108 is sufficient to make adequate electrical contact between the cylindrical body 110 and the internal cylinder 170 necessary to properly ground the conduit 10.

Figure 5:
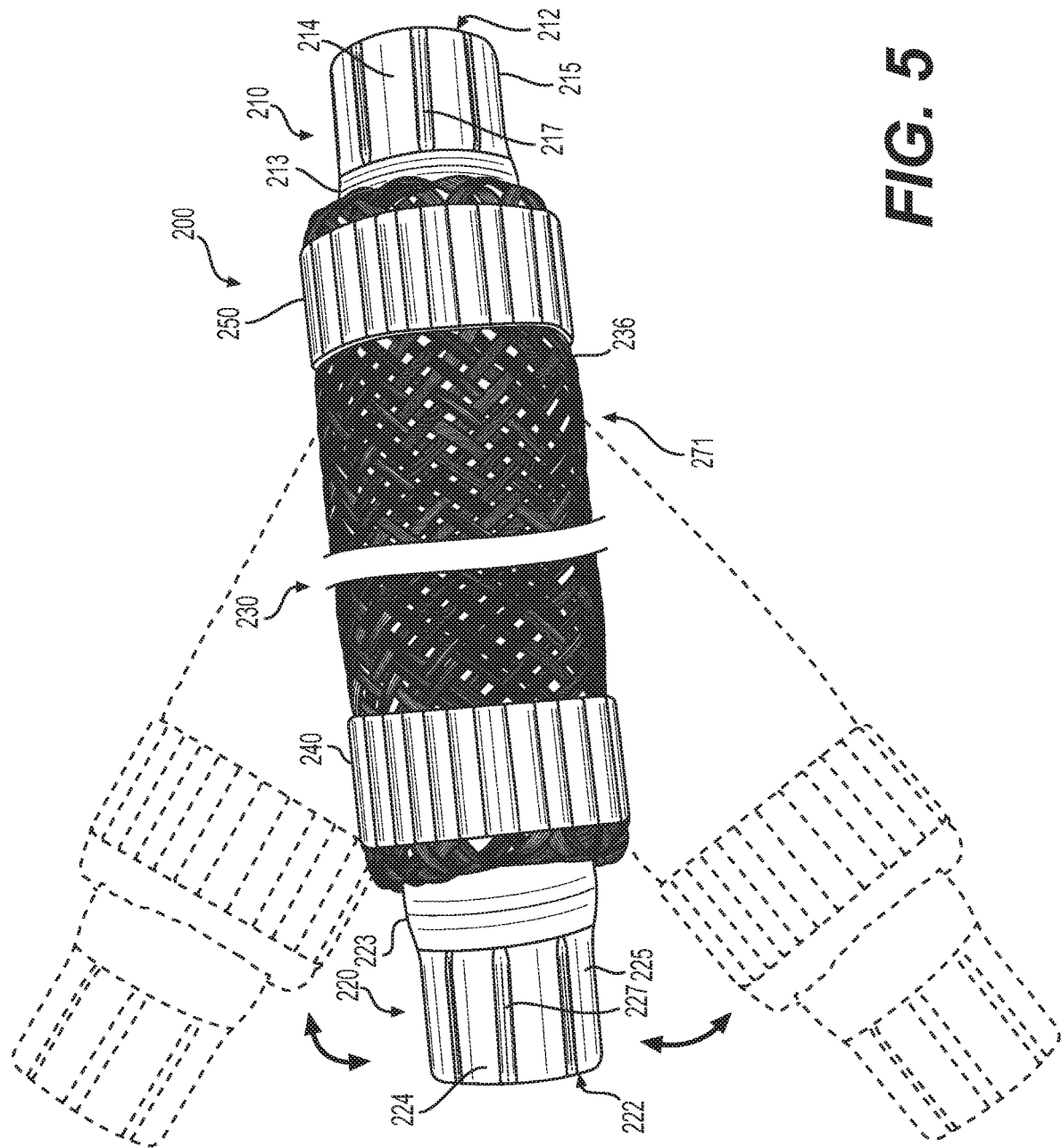
FIG. 5 is a side view of a deflection fitting.
Figure 6:
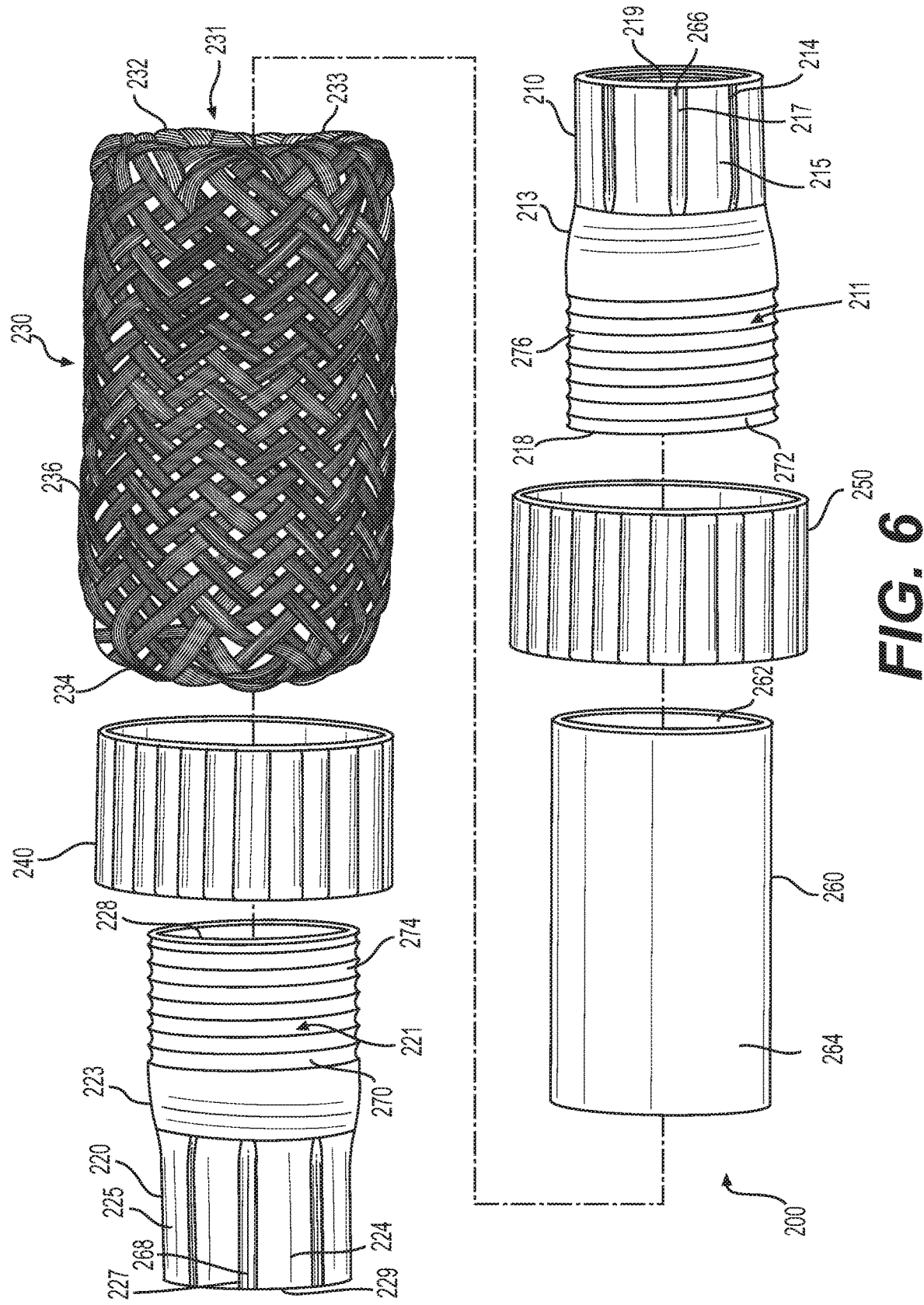
FIG. 6 is an exploded view of the deflection fitting.
Figure 7:
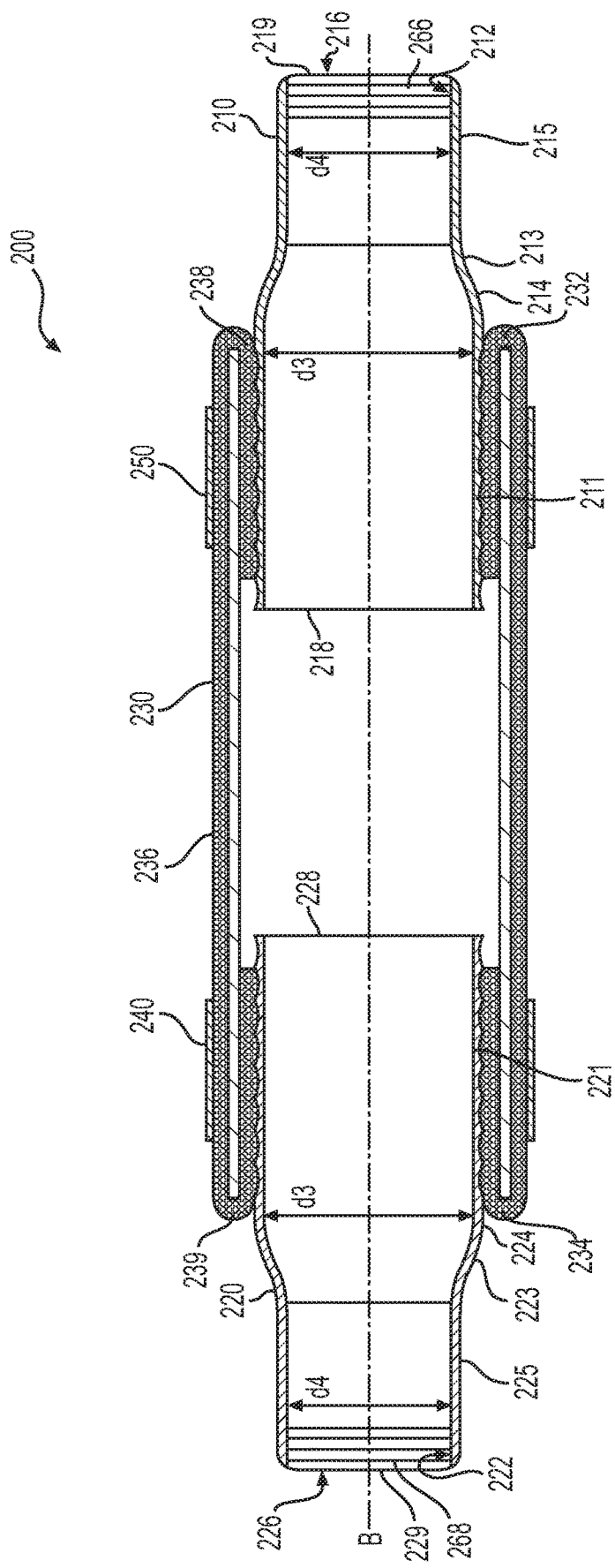
FIG. 7 is a cross section view of the deflection fitting.

Referring now to FIGS. 5-7, in another embodiment, a deflection fitting 200 according to the current invention has a first conduit connector 210, a second conduit connector 220, crimp rings 240, 250, an inner tube 260, and a sleeve 230. The deflection fitting 200 allows for angular movement between conduit attached to the conduit connectors 210, 220 when encountering vibrations or other disruptions. The deflection fitting 200 may allow for a deflection of up to 30 degrees from a normal or stationary position (FIG. 5). In one embodiment, a bend point 271 is located on the sleeve 230 between the crimp rings 240, 250. The bend point 271 corresponds to an end of the conduit connectors 210, 220 when they are coupled to the sleeve 230.

The conduit connectors 210, 220 each have an interior surface 212, 222. The interior surfaces 212, 222 may be configured so that they may be removably coupled to an electric pipe or conduit. The first and second conduit connectors 210, 220 are substantially similar and are hollow with a central bore 216, 226 along axis B and define inner surfaces 212, 222, respectively, such that electrical wiring or smaller conduit may be situated therethrough (FIG. 7). The first and second conduit connectors 210, 220 may be made from metals such as stainless steel, galvanized steel, electrogalvanized steel, aluminum, or any appropriate materials known in the art, whether now known or later developed. The conduit connectors 210, 220 may also be thin walled, thick walled, flexible, or rigid.

Figure 8:
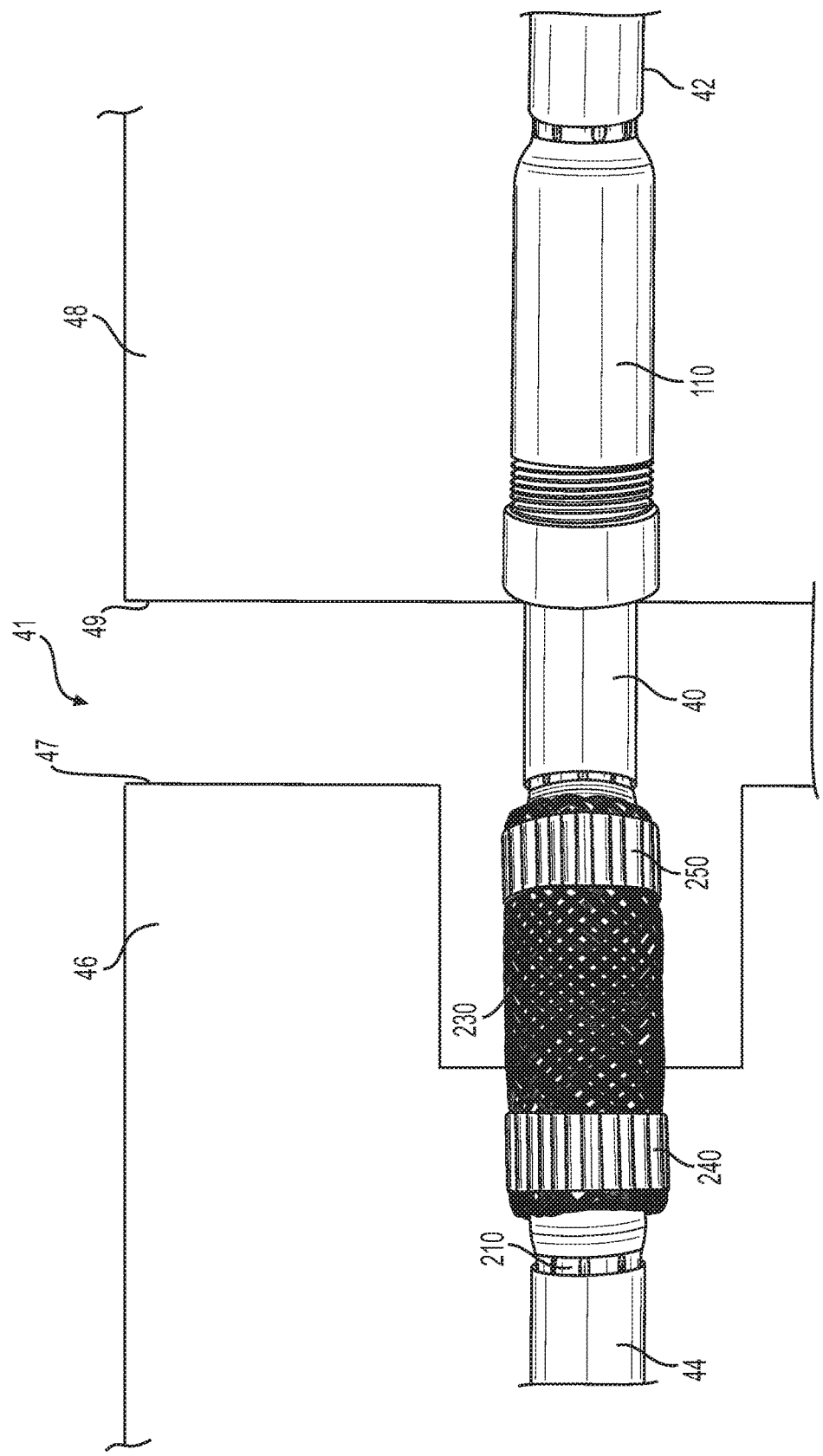
FIG. 8 is a side view of the expansion fitting and the deflection fitting at an expansion joint shown in cross section with portions cut away.

The first and second conduit connectors 210, 220 have an outer surface 214, 224 with a first end 218, 228 and a second end 219, 229. The first and second conduit connectors 210, 220 may have a threaded area 266, 268 on either the outer surface 214, 224 or inner surface 212, 222 so as to be better able to mate with electrical conduit 44 (FIG. 8). In one embodiment, the electrical conduit is schedule 40 pipe. The inner surfaces 212, 222 of the first and second conduit connectors 210, 220 have a cylindrical portion 211, 221. At least a portion of an outer surface 270, 272 of the first and second conduit connectors 210, 220 has ribs 274, 276 proximate the cylindrical portions 211, 221. The ribs 274, 276, each may have a smooth radius or may be threaded. In one embodiment, the ribs 274, 276 extend for 0.75 inches along the outer surface 270, 272 of the first and second conduit connectors 210, 220.

The cylindrical portion 211, 221 maintains a relatively uniform diameter d3 from the first end 218, 228 towards a neck 213, 223. The neck 213, 223 extends and tapers from the cylindrical portion 211, 221 to a conduit connector portion 215, 225 of the first and second conduit connectors 210, 220. The conduit connector portion 215, 225 has a diameter d4 that is less than the diameter d3 of the cylindrical portion 211, 221 of the first and second conduit connectors 210, 220.

The conduit connector portion 215, 225 may be adapted to be coupled to another fitting, electrical pipe, intermediate fitting, or conduit, and it is foreseen that a portion of the conduit connector portion 215, 225 may have a threaded area 266, 268. Alternatively, the conduit connector portion 215, 225 may have small grooves 217, 227 extending lengthwise at least partially around a circumference so that an electrical pipe or conduit can be secured.

The sleeve 230 is substantially tubular in shape with a central bore 231 and is larger in diameter than the first and second conduit connectors 210, 220 to allow the first and second conduit connectors 210, 220 to be coupled to and situated within the central bore 231 at opposed ends 232, 234. The sleeve 230 may be composed of a highly conductive material that may be used to internally ground an electrical circuit. In one embodiment, the sleeve 230 is made of braided copper; however, the sleeve 230 may be made of any appropriate materials known in the art, whether now known or later developed. In one embodiment, the braided copper wire may comprise copper wires that are 0.020 mm thick. The sleeve 230 is flexible, allowing for the sleeve 230 to be manipulated angularly.

The sleeve 230 has an exterior surface 236. In one embodiment, the sleeve 230 may be wrapped around an inner tube 260. The sleeve 230 may be coupled to the inner tube 260 using clamps or crimp rings 240, 250. The inner tube 260 is flexible, allowing for the deflection fitting 200 to be manipulated angularly. In one embodiment, the inner tube 260 is 5 mm thick. The inner tube 260 has an outer surface 264 with a smaller diameter than the inner surface 233 diameter of the sleeve 230. The inner tube 260 may be made from flexible plastics such as silicone, polycarbonate, or any appropriate materials known in the art, whether now known or later developed. At least a portion of the exterior surface 236 of the sleeve 230 may fold inwardly over the inner tube 260 and continue down an inner surface 262 of the inner tube 260, forming a first circular fold 238 and a second circular fold 239 (FIG. 7).

The sleeve 230 is in contact with an outer surface 214, 224 of the first and second conduit connectors 210, 220. The first fold 238 is in circular contact with the first conduit connector 210, and the second fold 239 is in contact with the second conduit connector 220. When the crimps 240, 250 are fastened around the sleeve 230 and the conduit connectors 210, the copper braid of the folds 238, 239 is pushed into the ribs 274, 276. The smooth radius of the ribs 274, 276 aids in forming a secure crimped connection. The ribs 274, 276 aid in preventing the copper braid from unraveling. The crimped connection between the folds 238, 239 and ribs 274, 276 electrically connects the conduit connectors 210, 220 to the sleeve 230, and may act as an external pathway to Earth ground. In one embodiment, the deflection fitting 200 is at least partially buried and acts as an equipment grounding conductor. In another embodiment, either or both folds 238, 239 may be electrically connected to an electrical ground conduit or wire that is secured to an Earth ground, ground screw, or neutral ground internally rather than externally (FIG. 7). The contact between the folds 238, 239 and the conduit connectors 210, 220 is sufficient to make adequate electrical contact necessary to properly ground the deflector fitting 200.

As shown in FIG. 8, the expansion fitting 100 is connected to the deflection fitting 200. The fittings 100, 200 are shown in an expansion joint 41 of a bridge, sidewalk, road, trestle, or any other structure requiring an expansion joint 41. As is shown in FIG. 8, there is a first bridge panel 46 and a second bridge panel 48. An intermediate fitting 40 may be exposed from a first end 47 of the first bridge panel 46 to a first end 49 of the second bridge panel 48. In one embodiment, the intermediate fitting is a six inch nipple. This configuration allows for lateral and angular movement, as well as expansion and contraction of conduit 42, 44. In the illustrated embodiment, the expansion fitting 100 is completely buried and the deflection fitting 200 is only partially buried, which allows for angular and lateral movement. In some embodiments, both the expansion fitting 100 and the deflection fitting 200 may be completely buried. It is understood that the fittings 100, 200 can be used underground, inside materials (e.g., concrete), or in exposed locations. The fittings 100, 200 may use a ground strap or bonding jumper to ground the circuit. Further, the fittings 100, 200 may use a ground strap or bonding jumper to provide a visual indication that the circuit is grounded.

It is foreseen that other such intermediate fittings or conduits, such as L-shaped, T-shaped, Y-shaped, Service bodies, C-shaped, etc. may be utilized to connect expansion fitting 100 to the deflection fitting 200, as the illustrated example is not meant to be limiting. It is foreseen that the intermediate fitting 40 may be connected to the deflection fitting 200 by any means known in the art, such as glue, adhesive, weld, spot weld, sonic weld, etc. The intermediate fitting 40 may be made of metal such as stainless steel, galvanized steel, electro-galvanized steel, aluminum, or any appropriate materials known in the art, whether now known or later developed. In one embodiment, the intermediate fitting 40 is six inch galvanized rigid conduit.

Figure 9:
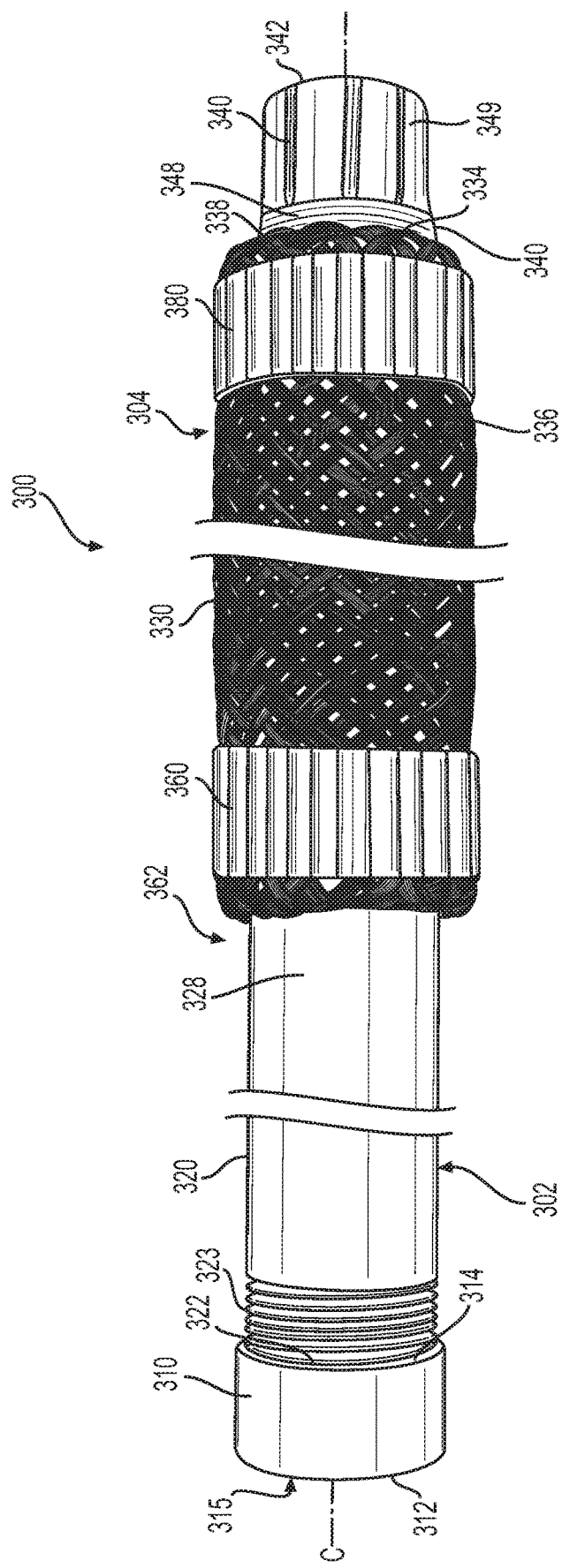
FIG. 9 is a side view of an expansion and deflection fitting.
Figure 10:
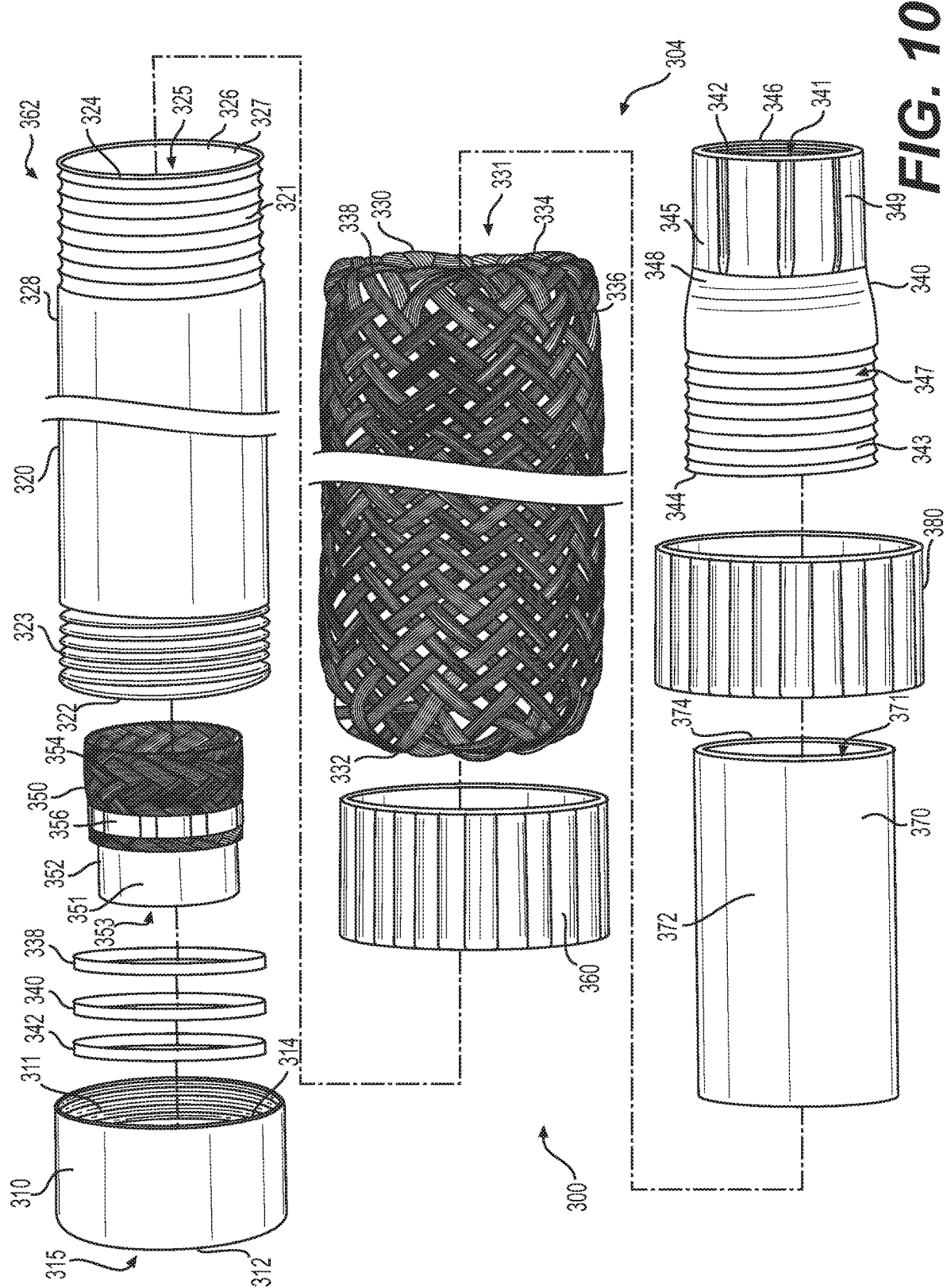
FIG. 10 is an exploded view of the expansion and deflection fitting.
Figure 11:
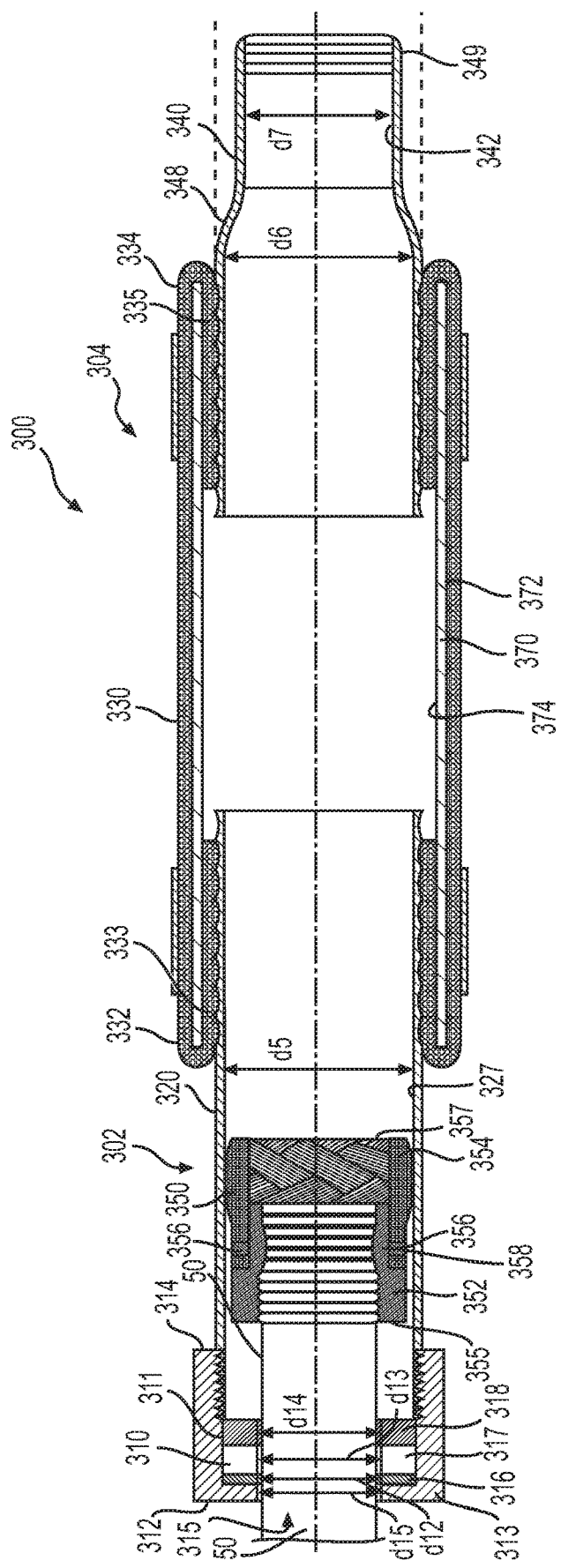
FIG. 11 is a cross sectional view of the expansion and deflection fitting.

In the illustrated embodiment of FIGS. 9-11, an expansion-deflection fitting 300 is shown. The expansion-deflection fitting 300 has an expansion portion 302 and a deflection portion 304. The expansion portion 302 has a cylindrical body 320, a cap 310, and an internal cylinder 350, and the deflection portion 304 has a sleeve 330, crimp rings 360, 380, an inner tube 370, and a conduit connector 340.

The expansion portion 302 is substantially similar to the expansion fitting 100, with the exception of the cylindrical body 320. The cylindrical body 320 is hollow with a central bore 325 along longitudinal axis C defining an inner surface 327 of the cylindrical body 320. The cylindrical body 320 maintains a constant diameter d5. The cylindrical body 320 has a first end 322 and a second end 324, the first end 322 is adapted to releasably couple to the cap 310. The cylindrical body 320 may have a threaded area 323 on an outer surface 328 of the cylindrical body 320 proximate the first end 322. At least a portion of the outer surface 328 of the cylindrical body 320 near the second end 324 has ribs 321 proximate the second end 324. The ribs 321 may have a smooth radius or may be threaded. The second end 324 of the cylindrical body 320 interacts with the deflection portion 304 of the expansion-deflection fitting 300 as will be further described below.

The cap 310 is substantially similar to the cap 130 of the expansion fitting 100. The cap 310 may be substantially cylindrically ring-shaped and may be removably coupled to the first end 322 of the cylindrical body 320. The cap 310 has an interior surface 311 having a portion that is at least partially threaded. The cap 310 has a head end 312 with a stop surface 313 and a central bore 315 defining an internal diameter d15 of the head end 312 (FIG. 11). The cap 310 also has a bottom end 314. The internal diameter d15 may be sized to fit electrical conduit or pipe. The cap 310 may also have a ring-shaped copper braid 316 proximate the stop surface 313 along the interior surface 311 of the cap 310. The ring-shaped copper braid 316 has an internal diameter d12 that is substantially similar to the internal diameter d15 of the head end 312. The cap may further include a pliable washer 317 proximate the copper braid 316 having an internal diameter d13 that is substantially similar to the internal diameter d15 of the head end 312. The cap may further include a rigid washer 318 proximate the pliable washer 317, said rigid washer 318 having an internal diameter d14 that is substantially similar to the internal diameter d15 of the head end 312.

The internal cylinder 350 is substantially similar to the internal cylinder 170 of the expansion fitting 100. The internal cylinder 350 is hollow and substantially ring-shaped, and is smaller in length than a length of the cylindrical body 320 to allow for lengthwise movement. The internal cylinder 350 includes a bushing section 352 and a ground transfer portion 354. The bushing section 352 has an outer surface 351 and an inner surface 353. The ground transfer portion 354 may be coupled to the bushing section 352 with a clamp 356. After the clamp 356 is fastened to the ground transfer portion 354 and the bushing section 352, the bushing section 352 may be warped, buckle inwards, or otherwise become deformed from a pressure applied while fastening the clamp 356 (see FIG. 11). The deformed area of the bushing 352 may act as a thread stop 358 for conduit or electrical pipe that may be removably coupled to the internal cylinder 350.

The ground transfer portion 354 of the internal cylinder 350 may be in contact with the inner surface 327 of the cylindrical body 320, providing a pathway of internal grounding continuity from unwanted voltages to the cylindrical body 350 to Earth ground. The ground transfer portion 354 may be flexible. In one embodiment, the bushing section 352 is at a first end 355 of the internal cylinder 350, and the ground transfer portion 354 is at a second end 357 of the internal cylinder 350.

The deflection portion 304 is substantially similar to the deflection fitting 200, with the exception that the second end 324 of the expansion portion 302 is situated within a central bore 371 of the inner tube 370, and the ribs 321 and the second end 324 of the expansion portion 302 interact with the sleeve 330. The ribs 321 may have a smooth radius or may be threaded. The deflection portion 304 allows for angular movement between the conduit connector 340 and the cylindrical body 320 when vibrations or other disruptions are encountered. The deflection may be up to 30 degrees from a normal or straight position.

The conduit connector 340 is substantially similar to the conduit connector 210, 220 of the deflection fitting 200. The conduit connector 340 is hollow with a central bore 341 defining an inner surface 342. The conduit connector 340 has an outer surface 345 with a first end 344 and a second end 346. The conduit connector has a cylindrical portion 347 that maintains a relative uniform diameter d6 from the first end 344 toward a neck 348. The neck 348 extends and tapers from the cylindrical portion 347 to a conduit connector portion 349 having a diameter d7 that is less than the diameter d6 of the cylindrical portion 347. The conduit connector portion 349 may be configured to be coupled to another fitting, pipe, intermediate fitting, or conduit. At least a portion of the outer surface 345 of the conduit connector 340 proximate the cylindrical portion 347 has ribs 343. The ribs 343 may have a smooth radius or be threaded.

The sleeve is 330 is substantially similar to the sleeve 230 of the deflection fitting 200. The sleeve 330 is substantially tubular in shape with a central bore 331 and is larger in diameter than the conduit connector 340 and the second end 324 of the cylindrical body 320. The sleeve 330 may be composed of a highly conductive material that may be used to internally ground an electrical circuit. In one embodiment, the sleeve is made of braided copper wire. The copper wire may be, for example, 0.020 wire.

The sleeve 330 has a first end 332 and a second end 334, as well as an exterior surface 336 and an inner surface 338. In one embodiment, the sleeve 330 may be wrapped around an inner tube 370. The inner tube 370 has an outer surface 372 with a smaller diameter than an inner surface 338 of the sleeve 330, such that the inner tube fits snugly within the sleeve 330. At least a portion of the exterior surface 336 of the sleeve 330 may fold inwardly over the inner tube 370 and continue down an inner surface 374 of the inner tube 370, forming a first circular fold 333 and a second circular fold 335.

Referring now to FIG. 11, the sleeve 330 may be coupled at the first end 332 to the second end 324 of the cylindrical body 320 with the crimp ring 360. The sleeve 330 may also be coupled at the second end 334 to the conduit connector 340 with the crimp ring 380. Copper braid of the folds 333, 335 is pushed into the ribs 321, 343. The smooth radius of the ribs 321, 343 aids in forming a secure crimped connection. The ribs 321, 343 aid in preventing the copper braid from unraveling. The crimped connection between the folds 333, 335 and ribs 321, 343 may internally ground an electrical circuit. In one embodiment, both folds 333, 335 may be electrically connected to an electrical ground conduit or wire that is secured to an Earth ground, ground screw, or neutral ground. The contact between the fold 333 and the second end 324 of the cylindrical body 320, and the contact between the fold 335 and the conduit connector 340 is sufficient to make adequate electrical contact necessary to properly ground the expansion-deflection fitting 300.

When in use, an electrical conduit 50 is coupled to the bushing section 352 of the internal cylinder 350. The electrical conduit 50 may be coupled to the bushing section 352 via threads. The internal cylinder 350 fits snugly inside the cylindrical body 320, and the first electrical conduit 50 passes through the aperture 315 in the head 312 of the cap 310. In one embodiment, an electrical ground wire may be secured to the ground transfer portion 354 of the internal cylinder 350. The ground transfer portion 354 may be in continuous contact with the inner surface 327 of the cylindrical body 320 as the conduit 50 expands and contracts, causing the internal cylinder 350 to move along the cylindrical body 320. The contact between the ground transfer portion 354 and the inner surface 327 of the cylindrical body 320 is sufficient to make adequate electrical contact necessary to properly ground the expansion-deflection fitting 300.

Thus, the present inventions have been described in detail with the understanding that the present detailed description is subject to modification and alterations without departing from the teaching herein. Therefore, the present inventions should not be limited to the precise details presented herein but should encompass the subject matter of the claims and their equivalents, which follow.

The invention claimed is:

1. An expansion fitting device, comprising:
   a longitudinal tubular body having
      a central bore defining an internal surface;
      a receiving end and an opposed end, the opposed end having a conduit fitting portion configured to be coupled to a first electrical conduit, the receiving end having a threaded portion;
      a cylindrical portion; and
      a neck connecting the cylindrical portion to the conduit fitting portion;
   a cap being ring shaped and threaded on a first end, the threaded first end being sized and shaped to mate with the threaded portion at the receiving end of the longitudinal tubular body; and
   an internal cylinder being slideable and positioned within the central bore of the longitudinal tubular body, the internal cylinder having:
      a central bore defining an internal surface;
      a receiving end and an opposed end;

a ring shaped bushing at the receiving end of the internal cylinder,
the bushing being configured to be coupled to a second electrical conduit, the bushing being spaced apart from the opposed end of the internal cylinder; and
a ground transfer portion overlaying a section of the bushing and extending from an end of the bushing to the opposed end of the internal cylinder, the ground transfer portion being spaced apart from the receiving end of the internal cylinder, the ground transfer portion being in continuous contact with the internal surface of the longitudinal tubular body, the ground transfer portion contacting the neck when the internal cylinder is fully inserted in the longitudinal tubular body, the ground transfer portion contacting the internal surface of the longitudinal tubular body at a maximum internal diameter of the longitudinal tubular body when the ground transfer portion is spaced apart from the neck;
wherein interaction between the neck and the ground transfer portion restricts the internal cylinder from leaving the central bore of the longitudinal tubular body via the opposed end of the longitudinal tubular body.

2. The expansion fitting device of claim 1, wherein the ground transfer portion is coupled to the bushing by a mechanical restriction.

3. The expansion fitting device of claim 1, wherein the ground transfer portion is made of a solid conductive material.

4. The expansion fitting device of claim 1, wherein the cap further includes at least one item selected from the group consisting of a polytetrafluoroethylene washer and a rigid washer.

5. The expansion fitting device of claim 1, wherein:
a section of the longitudinal tubular body includes the neck, a part of the conduit fitting portion immediately adjacent the neck, and a part of the cylindrical portion immediately adjacent the neck;
the entire section of the longitudinal tubular body has a constant and uniform wall thickness;
the entire cylindrical portion has a constant and uniform inner diameter; and
the inner diameter of the cylindrical portion is greater than a maximum inner diameter of the neck.

6. The expansion fitting device of claim 5, wherein the ground transfer portion is made of braided copper wire.

7. The expansion fitting device of claim 6, wherein:
the ground transfer portion is in continuous contact with the internal surface of the longitudinal tubular body at a contact section of the ground transfer portion; and
a majority of the contact section is located between: (a) the end of the bushing from which the ground transfer portion extends; and (b) the opposed end of the internal cylinder.

8. The expansion fitting device of claim 7, wherein the ground transfer portion is coupled to the bushing by a mechanical restriction.

9. The expansion fitting device of claim 7, further comprising a crimp ring coupling the ground transfer portion to the bushing, the crimp ring deforming the bushing such that the bushing has a thread stop.

10. The expansion fitting device of claim 1, wherein the ground transfer portion is made of braided copper wire.

11. The expansion fitting device of claim 1, wherein:
the ground transfer portion is in continuous contact with the internal surface of the longitudinal tubular body at a contact section of the ground transfer portion; and
a majority of the contact section is located between: (a) the end of the bushing from which the ground transfer portion extends; and (b) the opposed end of the internal cylinder.

12. The expansion fitting device of claim 1, further comprising a crimp ring coupling the ground transfer portion to the bushing, the crimp ring deforming the bushing such that the bushing has a thread stop.

13. The expansion fitting device of claim 1, wherein a maximum outer diameter of the expansion fitting device is defined by the cap.

* * * * *